UNITED STATES PATENT OFFICE.

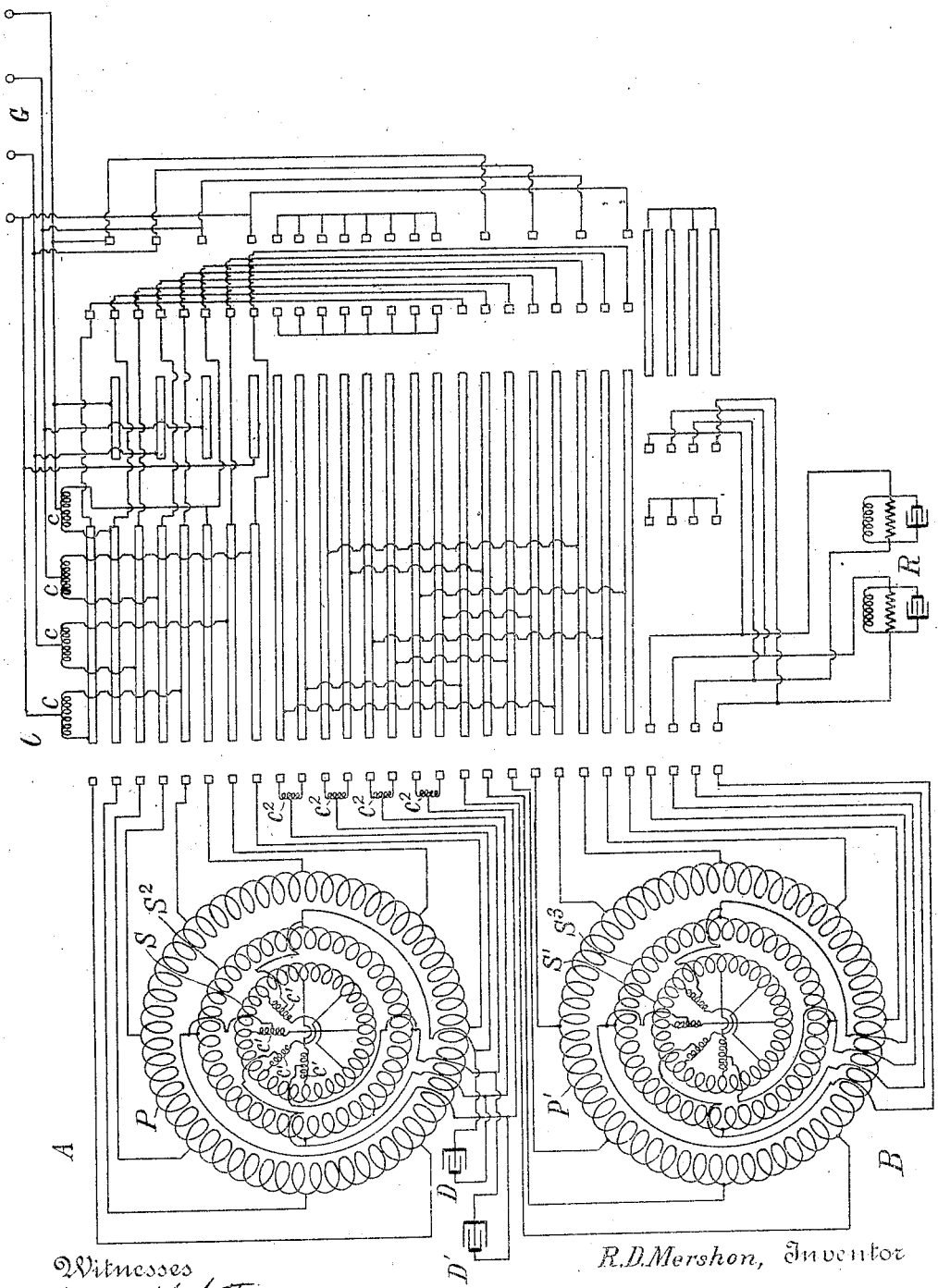

RALPH D. MERSHON, OF NEW YORK, N. Y.

CONCATENATED CONTROL OF ALTERNATING-CURRENT MOTORS.

1,112,022.  Specification of Letters Patent.  Patented Sept. 29, 1914.

Application filed June 11, 1906. Serial No. 321,094.

*To all whom it may concern:*

Be it known that I, RALPH D. MERSHON, a citizen of the United States, residing at New York, in the county and State of New York, have invented certain new and useful Improvements in Concatenated Control of Alternating-Current Motors, of which the following is a specification, reference being had to the drawing accompanying and forming part of the same.

The common method of varying the speed of a direct current motor by means of a rheostat or equivalent devices is to a certain degree wasteful, on account of the unavoidable losses in the rheostat. Where two or more motors are employed, however, it is possible to obtain different speeds by making various combinations of the motors in series and in multiple. For example, in traction work, using say two motors, it is customary to connect the motors in series for half speed, then in multiple for full or maximum speed. Between zero speed and half speed, produced with the motors in series, and between half and full speed, intermediate variations of speed are obtained by means of a rheostat or other suitable device or devices. This method, known as "series-multiple control," effects a large saving of energy, amounting roughly, in the case of two motors, to one half what would be wasted if rheostatic control alone were employed.

In view of the manifest advantages of the plan just outlined, efforts have been made to utilize the same method in the case of alternating current induction motors, but it has been found that for successful results the plan must be modified considerably. With motors of this kind, mere connection of the primary elements of the motors, (the element which receives power and that which delivers power being known as the primary and the secondary respectively), in series or in multiple will not accomplish the result desired. Instead, it is necessary to connect the primary of one motor to the source of current, its secondary to the primary of the second motor, the secondary of the second motor to the primary of the next, (if more than two motors are used), and so on, with a rheostat or other suitable device connected with the secondary of the last motor. Motors so connected are said to be connected in "concatenation," which is the equivalent, to a degree at least, of series connection of series direct current motors. It is more nearly equivalent to series connection of the armatures of shunt direct current motors, the fields of which are at all times excited at the line voltage.

As is well known, the synchronous, or maximum, speed at which motors in concatenation tend to run is the same as the synchronous speed of a single motor with a number of poles equal to the sum of all the numbers of poles of the motors in concatenation. For example, suppose a car driven by four induction motors, with two motors on or geared to one axle and two on or geared to the other axle, the gear ratio being the same in both cases. Suppose motors A and B, on the one axle, to have two and four poles respectively, and motors C and D on the other axle to have eight and sixteen poles respectively. Now if these four motors are connected in concatenation,—that is, with the primary of A connected to the line, the secondary of A to the primary of B, the secondary of B to the primary of C, and so on, with a rheostat in the secondary of D,—the combination of four motors will tend to run at a synchronous speed corresponding to $2+4+8+16=30$ poles, and by means of the rheostat we can regulate the speed over the whole range from zero to the full speed of the combination, that is, the speed of 30 poles less the "slip." If now motor A be omitted, and motor B connected to the line, the synchronous or full speed of the combination will correspond to $4+8+16=28$ poles, and we can again regulate by means of the rheostat, from a speed approximating synchronism for 30 poles to one approximating synchronism for 28 poles. If now motor A be replaced and B dropped out, leaving A, C and D in concatenation, the synchronous speed of the combination will corespond to $2+8+16=26$ poles, with rheostatic regulation from 28- to 26-pole speed. Thus, by various combinations, and by the use of each motor singly, speeds may be obtained corresponding to 30, 28, 26, 24, 22, 20, 18, 16, 14, 12, 10, 8, 6, 4, and 2 poles, with rheostatic control for intermediate speeds.

It will be observed that for all speeds except the lowest, (that corresponding to 30 poles), one or more of the motors, as many as three at some speeds, are idle. It may be stated generally that all the synchronous speeds of which a given set of motors is capable above the lowest synchronous speed, are produced by dropping out one or more motors from the original number. Thus in the example given above, to produce 12-pole speed the 2-pole and 16-pole motors are cut out; to produce 16-pole speed the 2-, 4-, and 8-pole machines are dropped; etc. In other words, for all speeds except the lowest a part of the equipment is idle, and for some speeds only one motor can be used. This is a manifest disadvantage, and it is therefore the chief object of my invention to provide a system of concatenated control in which more motors may be kept active in combinations corresponding to various synchronous speeds, or even, if desired, all may be kept active at all speeds. I secure this desirable capability by providing means for varying the number of poles in one or more of the motors. For example, to obtain say 22-pole speed with the four motors mentioned above it is, by the previous methods, necessary to drop out the 8-pole motor. But if the 16-pole motor could be changed to eight poles the original 8-pole machine could be retained, the sum of the numbers of poles of all four motors then being only twenty-two instead of thirty. To obtain 20-pole speed the 2-pole motor could then be omitted—or, according to my invention, the 4-pole motor could be changed to two poles, making the number of poles in all four machines twenty instead of twenty-two. To obtain 16-pole speed, the 2-, 4-, and 8-pole motors could each be changed to sixteen poles and all four then run in multiple. In this way, by varying the number of poles in one or more motors, as many of them as desired can be kept active at the various speeds, thus utilizing the equipment more economically than is possible with the ordinary method of concatenation. At the same time intermediate speeds at any or all steps may be obtained by rheostatic regulation, as desired.

Another objectionable feature of concatenated control as previously practised is the inductive drop or loss of voltage in the various motors with the result that the motors after the first in the series do not each get its proper proportion of the total voltage impressed on the concatenated series. This inductive drop or loss of voltage is similar to that which occurs in a transformer and is due to the same cause, namely, stray magnetic field. This is at all times a disadvantage, but so far as I am aware it has never been overcome. I propose to secure the desired result by the use of one or more condensers connected with the concatenated series of motors at proper points, as will be fully explained hereinafter.

For a more complete description of the various features of the invention reference may now be had to the annexed drawing, in which the figure illustrates diagrammatically a simple and convenient embodiment, employing two motors, the combination being capable of operating at four synchronous speeds. The figure also shows condensers connected to the leads from the secondary of the first motor to the primary of the second to compensate for the inductive drop in the first motor.

Referring now to the figure, A and B indicate two 4-pole motors. By tracing the connections in the diagrammatic controller C it will be seen that the primary P of the first motor is connected, through choke coils or auto-transformers $c$, with a 2-phase source G, for the production of four poles, when the controller is in its first position. The secondary winding S, of the motor A, is also connected for four poles, but in the connections are choke coils or auto-transformers $c'$, tapped at their middle points. These auto-transformers do not allow current (except their magnetizing current) to flow through their halves in series, but do allow equal currents to flow from the ends to the centers and out through the taps, and vice versa. The latter are connected, (through slip rings, not shown), to the centers of auto-transformers or choke coils $c^2$, which cause the current to divide and flow out through the halves of the coils, whence they are led, as will be seen by tracing the controller connections, to the primary winding P' of the second motor and delivered thereto at points to produce four poles. The secondary winding S' of the latter motor is connected for four poles, with auto-transformers or choke coils, tapped at their middle points, in the connections as in the former case. In the second motor the taps from the auto-transformers are brought out to slip rings (not shown), by which they may be connected with suitable regulating means, R, such as resistance, or inductance, or capacity, or any combination of two or more of these, for example all three, according to the results desired. It will therefore be seen that in the first position of the controller we have two 4-pole motors in concatenation—that is, the primary of the first is connected to the source of power and its secondary winding S is connected with the primary of the second motor, while the secondary winding S' of the latter is connected to a rheostat,—the terms "rheostat" and "rheostatic" being used herein to designate any of the devices mentioned above or any combination thereof. Consequently the two motors in combination tend to run at 8-pole synchronous speed, though the actual speed in the first position of the controller is lower by reason of the rheostat R.

In the next position of the controller it will be seen that the connections are maintained as in the first, except that the rheostat is cut out and the secondary connections of the second motor are simply short-circuited. Consequently the speed now rises approximately to synchronism for eight poles.

In the third position of the controller the primary $P_x$ of the first motor, is connected to the source at points to produce two poles. The secondary winding S, however, is connected for four poles through the choke coils or auto-transformers $c'$, and hence is "non-mutual" to the primary, that is, inductively independent thereof, and consequently is not affected by the primary when the latter has only two poles. This condition of "non-mutuality" is fully explained in my co-pending application Serial No. 319,034, filed on or about May 28, 1906, now Patent No. 931,136, issued August 17, 1909. The secondary winding S being unaffected by the 2-pole primary, an additional seconary winding $S^2$, connected for two poles, is provided, preferably on the same structure or core as the other. The same secondary winding S might be used instead, by making the necessary changes in its connections, but I prefer generally to use an additional winding. Each may then be permanently arranged for its particular number of poles. In this additional secondary winding the 2-pole connections are led to the taps which lead from the choke coils or auto-transformers to the slip rings, not shown, so that currents induced by the primary in the secondary winding $S^2$ will be delivered to the primary $P'$, of the second motor, at points to produce four poles, as before. The secondary $S'$ of the latter motor is again connected with the rheostat R. We therefore have at the third position of the controller a concatenated combination of a 2-pole and a 4-pole motor, tending to run at 6-pole synchronous speed, but actually at a lower speed, by reason of the rheostat.

In the fourth position of the controller the rheostat is cut out and the connections of the secondary winding $S'$ are short-circuited, giving approximately 6-pole synchronous speed.

In the fifth position the primary $P'$, of the second motor, is disconnected from the secondary winding S of the first and is connected to the source G in multiple with the first motor, which is now restored to 4-pole connections. At the same time the connections of the secondary windings S and $S'$ are short-circuited, so that the speed of the two motors, no longer in concatenation, will be approximately synchronous for four poles. At this speed the 2-pole secondary, $S^2$, of motor A is non mutual to the primary element, which has four poles, and is consequently unaffected thereby.

In the next, or sixth, position of the controller, both motors are changed to 2-pole and run in multiple. Inasmuch as the secondary winding $S'$, in the motor B, is connected for four poles it becomes non-mutual to the primary when the number of poles in the latter is changed to two. The second motor is therefore provided with a 2-pole secondary winding $S^3$, with its pole connections led to the taps from the centers of the choke coils or auto-transformers, as in the case of secondary winding $S^2$ in motor A. The two secondary windings of motor B are also preferably on the same structure or core. In this position of the controller it will be seen that the connections of the secondary windings $S'$ and $S^3$, in motors A and B respectively, are short-circuited, so that, the motors being in multiple, the speed is approximately synchronous for two poles. Thus with only two motors I am able to produce four synchronous speeds—corresponding to eight, six, four and two poles, using both motors at every speed. Two of these speeds, that for eight poles and that for six poles, are produced by concatenation, whereas by the methods employed heretofore only one concatenation speed could be obtained, namely, for eight poles. The system is also under rheostatic control for intermediate speeds. Only two such speeds are provided for in the figure, but it is clear that as many rheostatic speeds can be provided for as desired.

As mentioned before, the transformer action of motors in concatenation results in more or less inductive loss due to the magnetizing currents in the successive elements. It is highly desirable to overcome this objection as far as possible, and I have accordingly devised a plan by which very satisfactory results may be obtained in this respect and a more economical and effective operation of the system secured. This plan consists, briefly stated, in connecting one or more condensers to the system at one or more points. If a condenser be connected with the secondary of the last motor of the series, the condenser being used alone or, preferably, in combination with resistance, or with inductance, or both, (as described in my copending application Serial No. 257,991), the ill effects of stray field can be overcome at starting and the various motors made to receive substantially their proper proportions of the total impressed voltage, or even a greater voltage than they would receive if the stray field effects were absent. A more effective plan, however, is to use some capacity in connection with the secondary of the last motor and also connect capacities across the terminals of the secondaries of the other motors, that is, in multiple with the primaries fed thereby. Such a course produces better results not only because the capacity is distributed approximately in correspondence with the distribution of the reactance, represented by the stray field effects of the motors, but also because with such connections all the condensers except that connected with the secondary of the last motor will be effective to a degree, at least, at all speeds, whereas the condenser connected with the secondary of the last motor will be practically non-effective at full speed, its effect being greatest at zero speed and very insignificant at full speed or speeds approximating full speed. Hence if capacity were to be used only in connection with the secondary of the last motor the desired results would not be obtained at speeds near full speed, or at best the improvement would be but slight. This is due to the fact that whereas at zero speed there is on each secondary full frequency and a voltage bearing certain proportion to the impressed voltage, at full speed the frequency and voltage of the secondary of the last motor fall to near zero; while the frequencies of the secondaries of the other motors fall only by amounts dependent upon the places of the motors in the concatenated series, and never fall to zero. Similarly the voltages of the secondaries of all the motors but the last do not fall to zero but are maintained at values dependent upon the places of the motors in the series. It will therefore be seen that the condensers connected with the secondaries of the intermediate motors will have impressed upon them higher voltages and higher frequencies at the higher speeds, than would be impressed at the same speeds upon the condenser connected with the last secondary, and will therefore be more effective at such speeds for producing the results desired.

The values of the several condensers necessary to produce the desired effects can of course be readily determined, and the effect of stray field in the concatenation can thus be overcome to practically any desired extent. Condensers used for this purpose are shown in the drawing, at D, D'. They are connected across the leads which extend from the secondary windings of the first motor, A, to the primary of the next motor, B, that is, across an intermediate circuit of the concatenated system. If more than two motors are used, other condensers could be similarly connected, between each motor and the one immediately preceding. This feature is of particular advantage in connection with the herein described scheme of concatenation, but is applicable to advantage in the prior methods of concatenation and also in the case of a single motor whose speed is varied by a method analogous to concatenation, as described, for example, in my co-pending application Serial No. 319,033.

Electrolytic condensers may be used with advantage for the purpose just described, particularly in connection with the last motor of the concatenated series. Such a condenser has in it a high loss; which renders it in general undesirable for use in the primary element of the motor, but not in the secondary, since in the latter case the current due to the loss is effective in producing torque, as fully explained in my co-pending application Serial No. 257,991, before mentioned.

The operation of the system can also be improved by making suitable change in the total impressed voltage, when change of voltage is made desirable by change of speed. The advantages of such voltage changes, and convenient and simple means for effecting the same, are fully explained in my copending application Serial No. 190,440. The means therein described can readily be applied to the present invention.

The specific embodiment of the invention illustrated herein employs two motors, but of course the number is immaterial and as many as desired may be employed. Those illustrated are polyphase, in the present instance two-phase, but it is to be understood that the invention is applicable to single phase apparatus as well. It is to be noted however, that with a single phase motor as the first of the set, that is, the motor which is connected to the source of current, the succeeding motors are nevertheless polyphase, since the currents from the secondary windings of all the motors are necessarily polyphase.

It is not necessary that any of the motors have a plurality of secondary windings, since in each case a single winding can be employed for all the numbers of poles produced in its primary element, by providing suitable devices, such as for example manually or automatically operated switches, for making the necessary changes in the secondary connections when the number of poles in the primary is changed. A plurality of primary windings, instead of one, may be used if desired on any motor in which the number of poles is varied. In such case each primary winding may be arranged for a particular number of poles and the motor connections changed from one primary winding to another when the number of poles is to be changed, instead of changing the connections on the same winding. The type of windings employed, both primary and secondary, whether drum, polar, or of the ring type, as shown, or whether open or closed coil, is also immaterial. Nor is it essential that the condensers used to overcome the stray field effects be distributed among all the motors, since good results may be obtained with the condensers bunched at less points or even at one point, depending upon the results desired in the particular case, or upon conditions imposed by the design or construction of the apparatus, etc. In short, numerous variations or modifications to suit particular conditions or circumstances of use can readily be made by the skilled engineer, without departure from the proper scope of the invention as defined by the appended claims.

What I claim is:

1. The combination of an alternating current motor having primary and secondary elements each adapted to operate with different numbers of poles, an alternating current motor having a primary element connected with the secondary element of the first named motor to receive current therefrom, and capacity across the connections between the motors.

2. The combination of a plurality of alternating current motors, having primary and secondary elements each of which elements is adapted to operate with different numbers of poles, means for connecting the motors in concatenation or in multiple with the same or different numbers of poles, as desired, and means for connecting capacity across the secondary terminals of one or more of the motors when in concatenation.

3. The combination of an alternating current motor having a primary element and a plurality of independent secondary windings, an alternating current motor having a primary element, means for connecting the primary of the last named motor with any of the secondary windings of the first named motor, and means for varying the number of poles in the primary of the first named motor.

4. The combination of a plurality of alternating current motors each having a primary winding and a plurality of secondary windings, means for connecting the motors in multiple or in concatenation and for varying the number of poles in the primary winding of one or more of the motors, and means for connecting capacity across the secondary terminals of one or more of the motors.

5. The combination with a plurality of motors, of means for connecting the same in concatenation or in multiple with the same or different numbers of poles, as desired, and means connected across the terminals of an intermediate circuit of the system when in concatenation, to neutralize to a desired extent the stray field resulting from the concatenated connection.

6. The combination with a plurality of motors, controlling means for connecting the same in concatenation or in multiple at will with the same or different numbers of poles, as desired, rheostatic means, including resistance and capacity, for varying the speed of the combination and for overcoming to a desired extent the effects of stray field, said rheostatic means being connected with the controlling means whereby to be connected across or disconnected from the secondary terminals of one of the motors in concatenation.

7. The combination with a plurality of motors in concatenation, of one or more condensers connected across the connections of any two motors of the concatenated system, as set forth.

8. The combination with a plurality of motors in concatenation, of condensers connected across the secondary terminals of a plurality of the motors, as set forth.

9. The combination with a plurality of motors in concatenation, of a plurality of condensers distributed over the concatenated system and connected in multiple with the respective secondary circuits, as set forth.

10. The combination with a plurality of motors, of controlling means therefor, to connect the motors in concatenation or in multiple with the same or different numbers of poles, means connected across the terminals of an intermediate circuit of the system when in concatenation, to overcome to a desired extent the effects of stray field resulting from the concatenated connection, and rheostatic speed-varying means associated with said controlling means and the last motor of the series.

RALPH D. MERSHON.

Witnesses:
M. H. LINDEMAN,
A. E. MAHAN.